United States Patent [19]

Peterscheck et al.

[11] Patent Number: 4,744,908

[45] Date of Patent: May 17, 1988

[54] PROCESS FOR EFFECTING CHEMICAL REACTIONS

[75] Inventors: Hermann W. Peterscheck, Longmont; Leonard A. Kaufmann, Aurora, both of Colo.

[73] Assignee: VerTech Treatment Systems, Inc., Denver, Colo.

[21] Appl. No.: 17,659

[22] Filed: Feb. 24, 1987

[51] Int. Cl.$^4$ .......................... C02F 1/74; C02F 11/08
[52] U.S. Cl. ..................................... 210/747; 204/149; 210/748; 210/761
[58] Field of Search .............. 210/748, 758, 761, 774, 210/808, 177, 178, 181, 243, 149, 747, 762; 204/149; 165/133, 142, 135, 45, 155, 47

[56] References Cited

U.S. PATENT DOCUMENTS 4,564,458 1/1986 Burleson ........................... 210/761
4,671,351 6/1987 Rappe ................................. 210/761

Primary Examiner—Frank Sever
Attorney, Agent, or Firm—Cullen, Sloman, Cantor, Grauer, Scott & Rutherford

[57] ABSTRACT

A process for effecting chemical reactions, including wet oxidation reactions, in a deep well or down-hole reactor preferably providing a crosscurrent flow in a nested tube configuration wherein the influent fluid is in heat transfer relation with the effluent fluid. The disclosed process includes flowing an influent fluid including the reactants downwardly through a downcomer pipe which extends below ground in a subterranean opening or well casing forming a hydrostatic column of fluid, which defines a predetermined pressure, with the reactants at a temperature sufficient to initiate and maintain the desired chemical reaction. The method then includes flowing the effluent fluid upwardly through an upcomer pipe to ground level, preferably in heat transfer relation with the downflowing influent fluid. The method of this invention includes boiling the effluent fluid in the upcomer pipe, thereby reducing the hydrostatic fluid pressure in the upcomer and increasing the mass flow rate. The boiling of the effluent in the upcomer pipe may be initiated periodically at predetermined timed intervals to reduce pump pressure and increase the mass flow rate through the apparatus or the boiling of the effluent may be maintained to substantially eliminate pump pressure following initiation of an exothermic reaction in the reaction zone defined at the lower extent of a deep well reaction apparatus.

22 Claims, 3 Drawing Sheets

PROCESS FOR EFFECTING CHEMICAL REACTIONS

FIELD AND BACKGROUND OF THE INVENTION

This invention relates to improvements in methods of effecting chemical reactions and is particularly suitable for effecting accelerated chemical reactions in a cross-current flow, nested tube apparatus wherein the influent fluid is in heat transfer relation with the effluent. The process of this invention is also particularly, although not exclusively, suitable for effecting chemical reactions in a deep well reaction apparatus, such as used for carrying out the wet oxidation of sewage sludge and other liquid waste streams.

As set forth more fully in U.S. Pat. No. 4,272,383 of McGrew, assigned to the assignee of the present application, there are a number of chemical reactions that may be accelerated at elevated temperatures and pressures. Prior to the installation of a deep well reaction apparatus by the assignee at Longmont, Colo., based upon the concepts disclosed in the above-identified patent of McGrew, the methods used to effect wet oxidation of sewage sludge, for example, involved placing the waste in a high temperature, high pressure reactor at substantially ground surface level. Air or oxygen is pumped into the reaction vessel and heat is externally applied as disclosed, for example, in U.S. Pat. No. 2,665,249 of Zimmermann.

More recently, but prior to the above-identified McGrew patent, the prior art proposed several methods for effecting wet oxidation of liquid waste streams in a deep well reaction apparatus having concentric conduits extending vertically below ground in a subterranean shaft. U.S. Pat. No. 3,449,247 of Bauer, for example, discloses a method for effecting wet oxidation of a mixture of combustible refuse and fluid sewage carried out in the lower portion of a shaft extending into the earth a sufficient distance to provide the desired pressure by the head of fluid material in the shaft. The disclosed apparatus includes vertically-extending concentric conduits wherein the water and reactants comprising the influent stream are flowed downwardly in the outer conduit and the water and reaction product are flowed upwardly through the center conduit in heat transfer relation with the influent. Air or oxygen-enriched air is injected in the influent liquid and the disclosed method further includes injecting air in the reaction zone at the lower extent of the conduits. U.S. Pat. No. 3,606,999 of Lawless discloses a method and deep well reaction apparatus for treatment of fluid streams, including wet oxidation of sewage, which includes a vapor trap or separation device for collecting the gaseous reactant of the reaction. U.S. Pat. No. 3,853,759 discloses a pyrolytic method for treating a liquid sewage stream which includes limiting the combustion of the material by restricting the process to the oxygen present in the material, whereby the pressure at the bottom of the influent column supposedly causes the heated material to rise in the effluent column. Finally, U.S. Pat. No. 4,564,458 of Burleson, which is subsequent to the McGrew patent, discloses a method of effecting wet oxidation of organic waste materials in a waste water stream in a deep well reaction apparatus at super-critical temperatures and pressures, wherein the wet oxidation reaction is to be initiated by flowing an electric current through the water at the bottom of the well to generate resistance heat. It should be understood, however, that these prior art disclosures, excluding the McGrew patent, are purely theoretical and generally impractical. The disclosed deep well reaction apparatus were not built or tested.

An experimental deep well reaction apparatus was designed, installed and successfully operated by the assignee of the present application at Longmont, Colo. This installation, however, established that certain parameters and principles disclosed in the McGrew patent are not accurate or practical. For example, the McGrew patent states that no pumping pressure will be required to sustain a continuous flow through the deep well reaction apparatus and that there is no pressure differential across the wall dividing the concentric tubes or pipes. In fact, as established by the actual installation at Longmont, Colo., a substantial pumping pressure is required during start-up and continued operation of a deep well reaction apparatus. More importantly, the required pumping pressure increases during operation because of plugging of the downcomer and the build-up and accumulation of organic and inorganic scale or fouling. In actual practice, it was necessary to periodically shut down the operation of the deep well reaction apparatus to remove the plug and clean the conduits when the pumping pressure exceeded a predetermined maximum pressure, requiring frequent downtime. The initial pumping pressure averaged between 400 and 500 psi when the conduits were cleaned because of the frictional pressure drop. However, the pumping pressure increased to about 600 psi, because of the accumulation of plugging of the downcomer and fouling, requiring shutdown and cleaning of the conduits. As will be understood, the pumping of the influent liquid into the downcomer conduit at the pressures defined and the frequent shutdowns resulted in substantial expenses. A primary object of the present invention is to reduce these costs while improving the efficiency of the process.

It was further believed by those skilled in the art that any boiling of the liquid in the conduits could result in "geysering" if the boiling continued for any substantial period of time. The conduits extended into the earth over 5000 feet. Thus, the combined lengths of the upcomer and downcomer conduits totals about two miles. If geysering occurred as a result of boiling, the resultant geyser of steam, reaction products and sewage, for example, could cause injury and substantial damage to the deep well reaction apparatus. The McGrew patent, therefore, emphasizes the importance of controlling the temperature of the liquid in the reaction zone by adding or removing heat to accomplish a maximum reaction rate with the vapor pressure of the influent fluid at the local temperature being maintained always lower than the local pressure to prevent boiling of the influent fluid.

It has now been discovered that boiling of the effluent fluid results in unexpected improvements in the efficiency of the operation of a deep well reaction apparatus, including reduced pumping pressures, increased mass flow rates, reduced downtime for cleaning and decreased start-up time. It is therefore a further object of the present invention to initiate boiling of the effluent liquid in the upcomer conduit to reduce the pumping pressure and improve the efficiency of the reaction apparatus.

SUMMARY OF THE INVENTION

As set forth above, the process for effecting chemical reactions of this invention is particularly, although not exclusively, adapted for subterranean apparatuses including deep well reaction systems. The method of this invention may be utilized for treating or reacting various liquids, including effecting wet oxidation reactions of various industrial and municipal wastes entrained in a liquid, such as water. Thus, the process of this invention is particularly suitable for effecting wet oxidation reactions of various animal wastes, including municipal sewage sludge, organic agricultural wastes, and industrial wastes. As will be understood, the chemical reactions resulting from the process or method of this invention may also include various treatments of solid materials entrained in a fluid, including the treatment of nonwaste materials, such as the desulfurization of carbonaceous materials. The process or method of this invention is also suitable for effecting chemical reactions wherein one of the reactants is gaseous, such as oxygen, oxygen-enriched air or air.

The process for effecting chemical reactions of this invention includes flowing an influent fluid, including at least one of the reactants downwardly through a downflowing conduit or downcomer which extends below ground in a subterranean opening or shaft, such as a conventional oil well shaft. The column of fluid in the downcomer thereby defines a predetermined pressure and heat is added to initiate and maintain the desired chemical reaction, forming reaction products. Where the reaction is exothermic, the heat of reaction may be sufficient to sustain the reaction. The method of this invention then includes flowing the fluid and reaction products comprising the effluent upwardly through an upflowing conduit or upcomer to ground level. As described above, the method this invention further includes boiling the fluid in the upcomer conduit to reduce the hydrostatic pressure in the upcomer conduit and increase the mass flow rate through the system.

As described in the above-identified United States Patent of McGrew, which is incorporated herein by reference, the reaction may be initiated by adding heat to the influent fluid, preferably near the lower extent of the reaction apparatus, creating a reaction zone in the lower portion of the conduit. Where one of the reactants is a gas, such as oxygen, the gas in the method of this invention is preferably introduced in the downcomer adjacent the upper extent of the reaction zone, to limit the reduction of the density of the fluid column in the downcomer, further reducing the required pumping pressure. In the ideal system and process of this invention, the pumping pressure on the influent fluid may be eliminated, wherein the hydrostatic pressure of the fluid column in the downcomer is sufficient to flow the influent downwardly, and the boiling fluid in the upcomer is sufficient to raise the fluid in the upcomer conduit. As will be understood, however, it is anticipated that the friction of the fluid against the conduit walls, particularly as scale builds on the conduit walls, will continue to require pumping of the influent, although the process of this invention substantially reduces the required pumping pressure.

Boiling of the effluent fluid may be initiated by either reducing the back pressure in the effluent upcomer or by increasing the temperature of the effluent fluid. In the most preferred process for effecting chemical reactions of this invention, boiling of the effluent fluid is initiated by reducing the back pressure in the upcomer conduit. In the disclosed process for effecting chemical reactions, the chemical reaction is initiated in the downcomer conduit by heating the fluid and reactants in the reaction zone while maintaining a predetermined back pressure in the upcomer conduit. A temperature sensing means is provided in the upcomer conduit at a predetermined depth, and the back pressure in the upcomer conduit is then reduced to initiate and maintain boiling of the effluent fluid at the predetermined depth temperature. Alternatively, the temperature can be sensed in the downcomer. It is thus possible to control the boiling of the effluent to a predetermined depth or to periodically boil the effluent fluid at predetermined timed intervals.

As described more fully hereinbelow, the boiling of the effluent in the upcomer conduit results in several important advantages. First, the boiling of the effluent fluid substantially reduces the required pumping pressure, resulting not only in energy savings, but also limiting the requirement for shutdown and cleaning of the system. Second, the boiling of the effluent fluid permits a substantial increase in the mass flow rate through the system, increasing the efficiency of the system and further reducing the cost of processing. Finally, the boiling of the fluid in the upcomer reduces the required reaction temperatures resulting in further energy savings. It has also been found that the boiling of the effluent fluid spreads the reaction zone, increasing the efficiency of the system.

Other advantages and meritorious features of the present invention will be more fully understood from the following description of the preferred embodiments, the appended claims and the drawings, a brief description of which follows.

DESCRIPTION OF THE PREFERRED EMBODIMENTS OF THE METHOD OF THIS INVENTION

Figure 1:
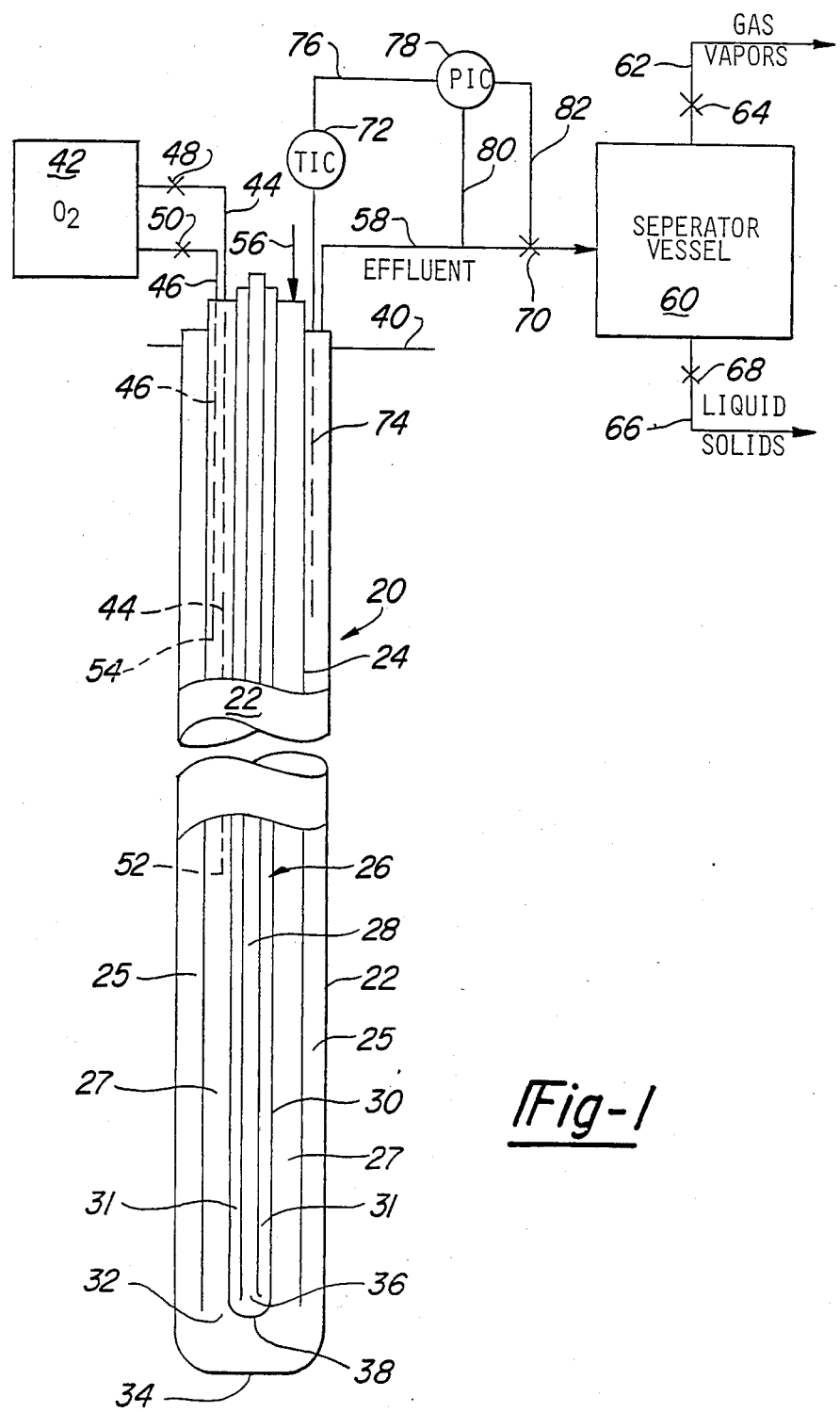
FIG. 1 is a schematic side elevation of a reaction apparatus suitable for the process for effecting chemical reactions of this invention.

FIG. 1 illustrates a continuous fluid treatment apparatus 20 of the general type installed by the assignee of the instant application on an experimental basis in Longmont, Colo. The disclosed treatment apparatus 20 is a vertical down-hole or deep well fluid reaction apparatus suitable for treatment of various combustible materials in a fluid or aqueous stream, wherein one of the reactants is gas, such as oxygen, oxygen-enriched air, or air. In a typical application, the influent stream may comprise organic animal waste, such as diluted municipal sewage sludge, suspended or entrained in a water stream, and oxygen is injected into the effluent at ground level or at various levels in the downcomer conduit. As disclosed in the above-referenced United States Patent of McGrew, the preferred fluid treatment apparatus comprises a plurality of nested pipes or conduits which extend generally vertically in a subterranean shaft or opening. In a treatment apparatus for the wet oxidation of, for example, diluted animal waste, such as diluted municipal sewage sludge, the conduits may extend approximately one mile into the ground to define annuli which, when filled with a fluid waste stream, create a hydrostatic column of very substantial fluid pressure. It will be understood, however, that the length of the conduits will vary depending on the type of material being treated and the desired reaction or treatment. It may also be suitable to utilize the reaction apparatus and method of this invention for a variety of reactions of this type in which solid particulate material, for example, is suspended or dissolved in a circulating fluid.

In a typical application, the conduits or pipes are generally not of unitary construction. Each vertically-extending conduit or pipe typically comprises a plurality of sections which are interconnected in serial alignment in a string, similar to the pipes in an oil well. In a typical municipal sludge wet oxidation application, for example, the length of each pipe is about 40 feet long, and the total length is about 5,200 feet. The flow rate through the reactor of the fluid being treated typically ranges from about 80 to 400 gallons per minute in a substantially continuous operation. The process for effecting chemical reactions of this invention will now be described with regard to a treatment apparatus and method for effecting wet oxidation of municipal sewage sludge for ease of description. It will be understood, however, that the process of this invention is equally applicable to various other reactions and treatments of materials, including various municipal, industrial and agricultural wastes, fluid reactions and the like.

As will be understood, the preferred reaction in a deep well reaction apparatus of the type disclosed herein is an exothermic reaction, such as the wet oxidation of municipal sewage sludge described, wherein the heat of reaction maintains the reaction in the continuous fluid stream. In the wet oxidation of municipal sewage sludge, the wet oxidation reaction is initiated at about 350° F. In a typical reaction system of the type disclosed in the McGrew patent, the reaction initiation temperature of 350° F. is reached at about 2000 feet below ground surface. Various factors, however, affect the actual reactor temperatures, pressures and flow rates. In actual operation, organic and inorganic scale builds up on the conduit walls, affecting all three factors. As the scale builds, the required pumping pressure increases and the flow rate decreases until the reactor must be shut down for cleaning. As will be understood, there is an initial pumping pressure resulting from the frictional resistance of the fluid flowing through the conduits or pipes, and this frictional resistance increases as scale builds up in the pipes. This is particularly true in the upper portion of the reaction zone located below the initiation temperature of the reaction. As described herein, boiling of the effluent in the upcomer pipe or conduit substantially improves the reactor efficiency.

In the disclosed embodiment of the reaction apparatus 20, the exterior or outermost conduit 22 surrounds conduit 24 to define an upcomer passage or annulus 25. In the disclosed embodiment, conduit 24 surrounds a heat exchanger 26 to define a downcomer passage or annulus 27. As described in the above-referenced McGrew patent, heat exchanger 26 may be utilized to control the temperature of the reaction vessel, whereby heat may be added or removed. The disclosed embodiment of the heat exchanger 26 includes a downcomer pipe 28, which is surrounded by an upcomer pipe 30, defining an upcomer annulus 31. Oil, water, steam or other heat exchange medium is circulated through the heat exchanger 26 to heat or cool the reaction vessel, as required. As will be understood, one object of the heat exchanger is to initiate the desired reaction in the lower portion of the reactor, which is referred to herein as the reaction zone. Heated oil, water or steam is therefore transferred downwardly through the downcomer pipe 28 to the lower portion of the reactor, where the hottest heat exchange medium is in heat transfer relation with the downwardly flowing influent in annulus 27. Another object of the heat exchanger is to remove heat when the reaction becomes autogenic, as necessary. Another function of the heat exchanger is to stabilize the temperature and thereby the operation of the system. It is possible, however, to initiate the desired reaction by other means, including a single steam pipe which extends into the reaction vessel, particularly where an aqueous system is utilized. Electrical heaters may also be considered; however, the most preferred system includes a heat exchanger for addition or removal of heat, as described.

The municipal sewage sludge which contains combustible organic material is introduced into downcomer annulus 27 as an influent waste stream which flows downwardly through annulus 27 and which is in contact with heat exchanger 26. In the wet oxidation of municipal sludge, as described in the above-referenced McGrew patent, wherein boiling of the liquid is prevented by maintaining a predetermined pressure, the oxidation reaction typically begins at about 2000 feet below ground surface at a fluid waste stream temperature of about 350° F. The reaction proceeds slowly as the fluid waste stream continues to flow downwardly and the temperature of the fluid waste stream increases to about 500° F. at a depth of approximately 3000 to 5000 feet below ground level. The exothermic wet oxidation reaction is then quite vigorous, establishing a reaction zone, particularly in the downcomer annulus 27, and considerable heat is generated. As disclosed, the bottom 32 of conduit 24 is open such that the reaction products and liquid flow from the downcomer annulus 27 to the upcomer annulus 25. The heated fluid, which contains the reaction products, is then flowed upwardly through upcomer annulus 25 as the effluent waste stream. By virtue of the heat transfer or heat exchange relationship of the apparatus, the heat of the upcoming effluent is transferred to the downcoming influent through pipe 24. Similarly, downcomer pipe 28 of heat exchanger 26 is provided with an open end 36, and the upcomer pipe 30 has a closed end 38. The heat transfer fluid, such as oil, is received through downcomer pipe 28 and flows back up through annulus 31, thereby recirculating the heat transfer fluid and transferring the heat primarily to the influent stream in the lower portion of annulus 27 to establish the reaction zone, as described.

FIG. 1 also illustrates schematically the preferred method of injecting oxygen or an oxygen-rich gas in the process for effecting chemical reactions of this invention. As will be understood, the pressure of the hydrostatic column of the influent in annulus 27 will be dependent upon the density of the fluid. Thus, the gaseous reactant is preferably injected below ground level 40 at or near the upper extent of the reaction zone, which is the initiation temperature of the desired reaction. In the wet oxidation of municipal waste sludge, the initiation temperature is about 350° F. and typically occurs at about 2000 feet below ground level 40. One desirable effect of boiling the effluent in the upcomer annulus 25 is a spreading of the reaction zone. Where the effluent is boiling, the reaction zone may begin at about 1000 feet, and the oxygen should then be injected at about 1000 feet. It may therefore be desirable to have multiple oxygen injection locations, particularly where the liquid in the upcomer annulus 25 is periodically boiled at timed intervals, as described hereinbelow. Further, as described in a copending United States patent application assigned to the assignee of the present application, it may be desired to periodically pulse oxygen into the influent annulus 27 at or near ground level to reduce fouling in the downcomer annulus.

In the embodiment of the deep well reaction apparatus disclosed in FIG. 1, two oxygen injection locations are provided for intermittent boiling in the upcomer annulus 25. The system includes a source of oxygen 42 which may be a compressed air tank or other source of oxygen. In the most preferred embodiment, pure or substantially pure oxygen is injected into the downcomer annulus, wherein the source of oxygen may be liquid oxygen which is pumped to a liquid oxygen atmospheric vaporizer, not shown, to provide substantially pure oxygen under pressure. The oxygen is delivered to the reaction apparatus through lines 44 and 46 and is controlled by valves 48 and 50, respectively. The first line 44 extends to a predetermined depth below ground surface level 40 to inject air through opening 52 adjacent the upper extent of the reaction zone when the liquid in the upcomer annulus 25 is not boiling, and line 46 extends to a lesser depth for injection of oxygen through opening 54 when boiling in the upcomer annulus 25 is initiated. In a typical application, the lower injection point 52 may be approximately 2000 feet below ground surface level 40, and injection point 54 may be approximately 1000 feet below ground surface.

Influent fluid is introduced into the reactor through line 56 and flows downwardly through the downcomer annulus or passage 27. During start-up, heat is transferred from heat exchanger 26 to the downflowing influent to initiate the wet oxidation reaction. As described, when the temperature of the influent liquid reaches approximately 350° F., the wet oxidation reaction is initiated. In a typical start-up procedure, water is initially used as the influent until the temperature of the influent water reaches approximately 350° F., and the water is then replaced with diluted sewage sludge having a predetermined chemical oxygen demand (COD). The mass of oxygen required to complete the oxidation reaction is termed the chemical oxidation demand of the sewage sludge. As the sewage sludge is introduced into the reactor, oxygen is also introduced, preferably through the lower injection point 52. As described, the influent is then received through the open end 32 of conduit 24 and circulated upwardly through the upcomer annulus 25, which is in heat transfer relation with the fluid in the downcomer annulus 27. The effluent is received from the upcomer annulus 25 in line 58 and transferred to a conventional separator vessel 60 where the effluent is separated into a gaseous phase at the top of the separator vessel and a liquid/solid phase at the lower portion of the separator vessel. The gas and vapors are removed from the separator vessel through line 62, which is controlled by valve 64, and the liquid and solids are removed from the bottom of the vessel through line 66 and controlled by valve 68.

The "back pressure" of the system, which is the pressure on the influent in the outer upflowing annulus 25, is controlled by valve 70. The valve 70 is opened a predetermined amount to maintain a predetermined back pressure on the effluent stream. During start-up, for example, the back pressure on the effluent is maintained to prevent boiling. When the pressure is reduced to the boiling pressure of the effluent liquid at a predetermined temperature, the effluent will boil. As described above, it was believed by those skilled in the art that sustained boiling in the effluent stream would result in "geysering" of the system. That is, the boiling would travel down the upcomer annulus 25 until it reached the opening 32 to the influent annulus 27, resulting in a blow-out of steam, untreated sewage, and reaction products. Every effort was therefore made to avoid boiling in the upcomer passage 25 by controlling the back pressure through valve 70. The back pressure was always maintained to prevent boiling, or the pressure was immediately increased when boiling was initiated spontaneously.

The deep well reaction apparatus shown in FIG. 1 is specifically adapted to initiate and maintain boiling of the effluent in the upcomer passage or annulus 25 or, alternatively, periodically boil the effluent. The apparatus includes a conventional temperature indicator control (TIC) 72 having a temperature sensing line 74 which extends downwardly into the upflowing effluent passage or annulus 25. In the disclosed embodiment, the sensor line 74 extends into the effluent passage 25 to a point adjacent the upper extent of the reaction zone when boiling is initiated in the upcomer passage 25. The temperature indicator control 72 is connected by line 76 to a conventional pressure indicator control (PIC) 78. The pressure indicator control 78 includes a pressure sensor line 80 connected to the effluent output conduit 58 and a control line 82 connected to valve 70. In one embodiment of the method of this invention, the liquid in the upcomer passage 25 may be periodically boiled when the back pressure of the effluent in line 58 reaches a predetermined maximum pressure. The pressure in effluent conduit 58 is sensed by the pressure indicator control 78 through line 80, and the back pressure, which is controlled by valve 70, is then reduced by control line 82 to the boiling pressure at a predetermined depth temperature as indicated by the temperature sensor line 74 of temperature indicator control 72. The boiling in the upcomer can then be maintained by operation of the pressure indicator control, as described. That is, the back pressure is continuously adjusted by adjusting valve 70 to maintain boiling. Alternatively, boiling in the upcomer passage 25 can be periodically initiated at predetermined timed intervals to improve the efficiency of the system, as shown below.

Figure 5:
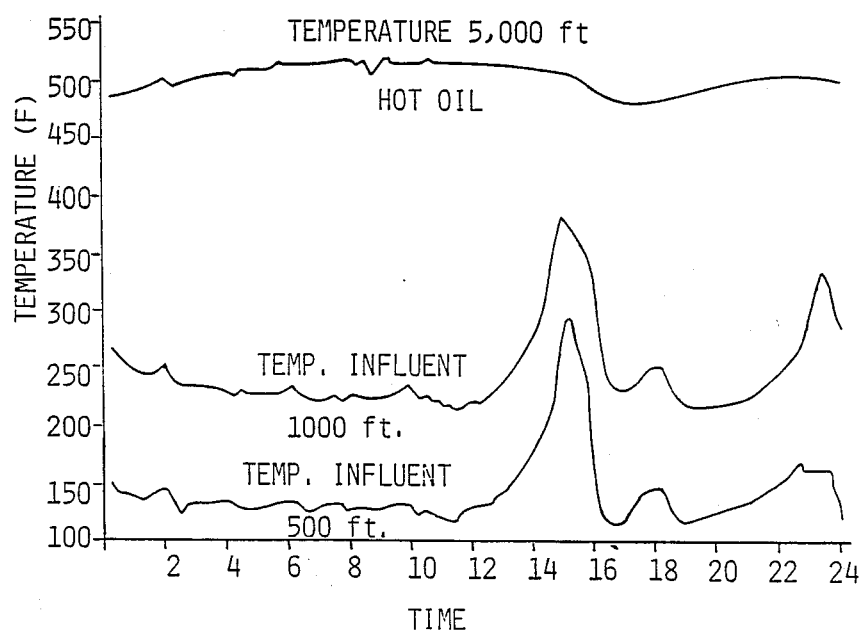
FIG. 5 is a graph illustrating the reaction temperatures following boiling of the effluent fluid in the apparatus shown in FIG. 1.

FIGS. 2 to 5 illustrate the effect of boiling the effluent liquid in the upcomer upon the pressure profile of the reaction vessel (FIG. 2), the sludge mass flow rate (FIG. 3), the process vapor pressure or oxygen feed rate to the reaction vessel (FIG. 4) and the reactor temperatures (FIG. 5).

Figure 2:
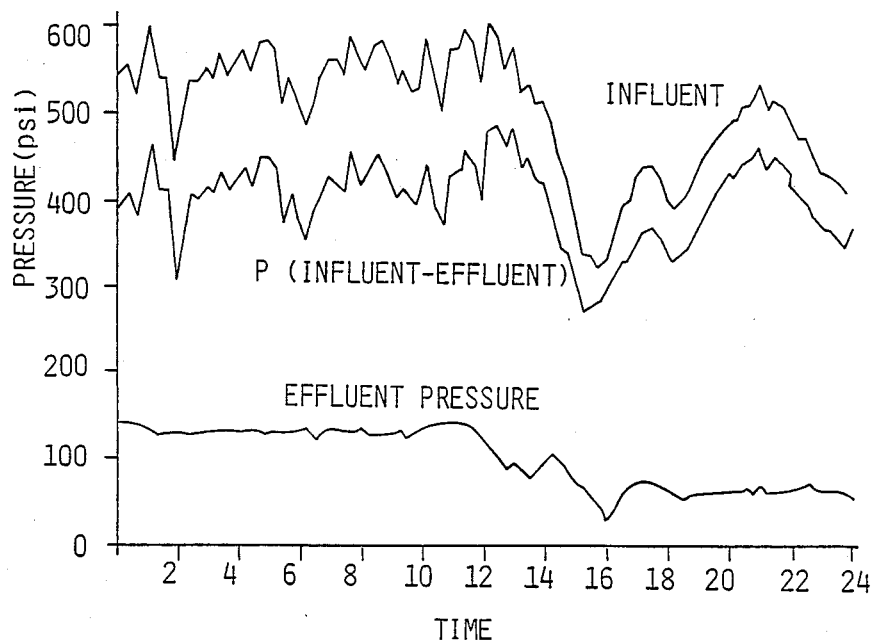
FIG. 2 is a graph illustrating the changes in the reaction pressures following boiling in the upcomer conduit of the reaction apparatus illustrated in FIG. 1.
Figure 3:
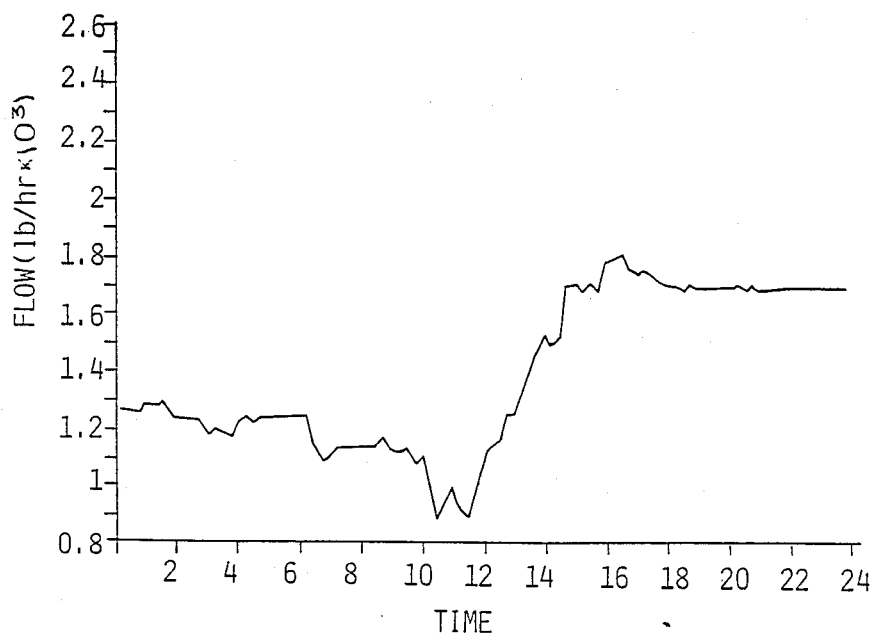
FIG. 3 is a graph of the mass flow rate following boiling in the upcomer conduit of the reaction apparatus shown in FIG. 1.
Figure 4:
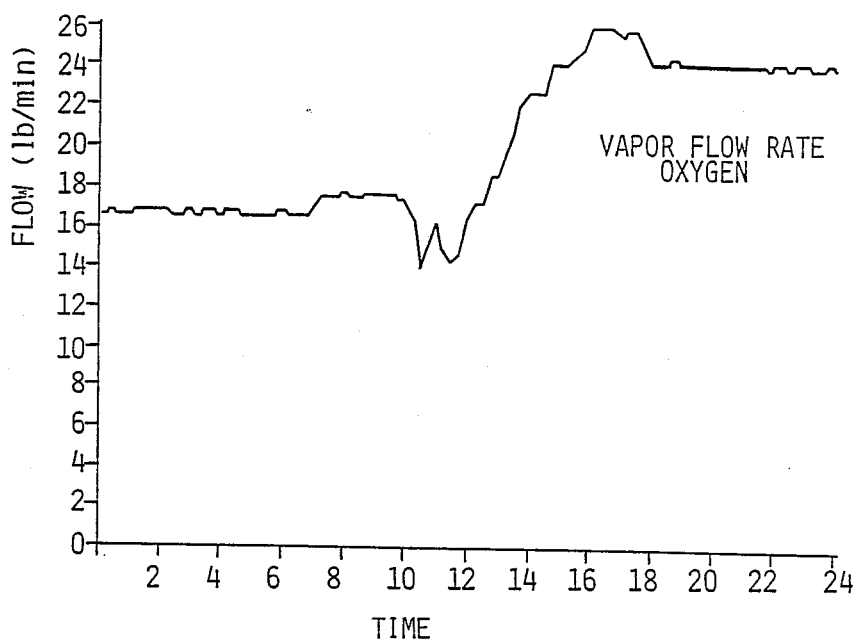
FIG. 4 is a graph illustrating the vapor flow rate following boiling of the effluent fluid in the apparatus shown in FIG. 1.

The graphs of FIGS. 2 to 5 are taken from computer readouts of the experimental operation of the deep well reaction apparatus at Longmont, Colo. As shown in FIG. 2, the pumping pressure (Influent) was averaging about 550 psig, and the pumping pressure exceeded 600 psig at about 10 a.m. (10); actual pressure readings before the boiling experiments were 616 psig. The effluent pressure was maintained at about 130 psig to avoid boiling of the effluent, and Delta P (Influent Pressure less Effluent Pressure), which is the pressure drop across the reaction vessel, averaged about 420 psig. At about 10 a.m. (10), the influent sludge flow rate (FIG. 3) had to be reduced because the pump pressure was too great. Under normal operation, the system would have been shut down for removal of the influent plug and cleaning when the pumping pressure exceeded 600 psig.

Instead of shutting down the reaction vessel for cleaning, boiling was initiated in the influent, beginning at about noon (12) by manually reducing the back pressure (effluent pressure) about 50 psi (see FIG. 2). The reduction in the influent back pressure was accomplished by opening control valve 70 in FIG. 1. The manual reduction in the back pressure (effluent pressure) initiated boiling of the effluent liquid, which resulted in a disproportionate decrease in the influent pressure or pumping pressure to less than 350 psig. Reduction in the back pressure further allowed a dramatic increase in the sludge influent flow rate (FIG. 3) from about 900 pounds per hour to 1800 to 1900 pounds per hour and a corresponding increase in the oxygen flow rate (FIG. 4) from 15 pounds per minute to above 26 pounds per minute.

The response of the temperature profile in the reaction vessel is shown in FIG. 5. As shown, the initial manual back pressure adjustment at about noon (12) resulted in an increase in the temperature of the effluent in the upcomer, which stabilized after several hours. The downhole temperature (hot oil at 5000 feet) was not materially affected.

The pressure drop (Delta P) across the reaction vessel is determined by the frictional pressure drop and the difference in the static heads between the downcomer and the upcomer. In addition to these pressure drops, fouling caused by scale build-up on the conduit walls, and plugging within the downcomer caused by restriction of the downcomer area, were responsible for a greater than calculated pressure drop. The pressure drop across the reactor requires pumping of the influent liquid and compression of the influent oxygen to overcome the pressure drop. The plugging of the downcomer and, to a lesser extent, the scaling of the reaction conduit walls results in an increasing inlet pressure with operating time. Shutdowns are normally required to remove the plug with a backwash or a sectional caustic wash, or to remove both the plug and the scale with a sequential caustic and acid washes.

As shown by the graphs of FIGS. 2 to 5 described hereinabove, a manual reduction in the back pressure of the reaction vessel initiates boiling of the effluent in the upcomer, a disproportionate decrease in the pumping pressure, and an actual decrease in the pressure drop across the reaction vessel. The decrease in the back pressure and boiling in the upcomer reduces the static head in the upcomer by increasing the vapor fraction and the temperature in the upcomer. Previously, any temperature increase, and especially any boiling in the upcomer, was viewed as detrimental and was avoided because of the potential danger of geysering the entire reaction vessel. As shown by these experiments, however, the reaction vessel temperature in the upcomer stabilizes at a temperature to satisfy the energy balance after the pressure profile stabilizes. In order to keep the temperature in the upcomer high, and thereby operate at a low pressure drop across the reaction vessel, a control loop may be established, as shown in FIG. 1, wherein the back pressure is continuously adjusted by adjusting the opening through valve 70 based upon the temperature at a predetermined depth as sensed by the temperature sensor line 74 of the temperature-indicating control 72. The temperature is maintained by increasing or decreasing the back pressure as indicated by FIG. 5. That is, a decrease in the back pressure will cause an increase in the temperature of the effluent, maintaining boiling in the upcomer. Further, boiling can be maintained to a predetermined depth with safe operation while avoiding geysering. Alternatively, the boiling of the effluent in the upcomer may be quenched eventually by substantially increasing the mass flow rate. Thus, it is possible to periodically boil the effluent liquid in the upcomer at timed intervals, for example, to reduce the pumping pressure, increase the mass flow rate, and improve the efficiency of the system.

In the example shown in FIGS. 2 to 5, the mass flow rate through the reaction vessel was doubled by manually reducing the back pressure and initiating boiling of the effluent in the upcomer. As will be understood, it is also possible to initiate boiling of the effluent in the upcomer by increasing the temperature of the effluent while maintaining a predetermined pressure. The resultant advantages of boiling the effluent in the upcomer are several. The reduction in the pressure drop across the reaction vessel results in a lower inlet or pumping pressure and consequent savings in electric power required for pumping of the liquid influent and compression of the gas influent. Capital savings result because the pressure rating of the equipment can be reduced. Second, boiling of the effluent results in an increased residence time in an existing reaction vessel due to more efficient utilization of the heat exchange portion. As shown by the temperature profiles of FIG. 5, boiling of the effluent fluid resulted in a spreading or increase of the reaction zone. Thus, it is possible to reduce the reaction vessel volume for a given production rate which further results in capital savings. Increased residence time further results in lowered toxic material discharges in industrial designs, for example. Third, boiling of the influent fluid reduces the number of shutdowns required for cleaning and greater production rates for a longer period of time. This results in significant reductions of operating and capital costs due to the increased on-line factors. Finally, the increased production rate between wash cycles reduces the fuel required during start-up and chemical consumption during washes. Due to the fewer wash cycles required, the lifetime of the reaction vessel further increases. These several improvements resulting from boiling the effluent are unexpected because such boiling was believed to result in geysering, which would be extremely detrimental to the system.

We claim:

1. In a process for effecting chemical reactions between at least two reactants, said process comprising the following steps:
   (a) flowing an influent liquid including said reactants downwardly through a downflowing passage extending below ground in a subterranean opening forming a hydrostatic column of liquid defining a predetermined pressure with said reactants at a temperature sufficient to initiate and maintain said chemical reaction and forming reaction products;

(b) flowing said liquid and reaction products as an effluent liquid upwardly through an upflowing passage to ground level; and (c) controlling the temperature and pressure of said effluent liquid to initiate boiling of said liquid in said upflowing passage, vaporizing at least a portion of said effluent liquid, generating vapor bubbles in said upflowing passage and thereby reducing the hydrostatic pressure in said upflowing passage and increasing the mass flow rate through said passages.

2. The process for effecting chemical reactions defined in claim 1, including sensing the temperature of said liquid in said upflowing passage at a predetermined depth and controlling the outlet pressure of said fluid to initiate and maintain boiling of said fluid in said upflowing passage at said predetermined depth.

3. The process for effecting chemical reactions defined in claim 4, wherein said method further includes controlling and limiting the boiling of said liquid in said upflowing passage to the upper portion of said upflowing passage.

4. The process defined in claim 1, wherein said method includes controlling the boiling of said liquid in said upflowing passage to periodically boil said liquid in said upflowing passage at predetermined timed intervals.

5. The process for effecting chemical reactions defined in claim 4, wherein said method includes controlling and limiting the boiling of said liquid in said upflowing passage to the upper portion of said upflowing passage.

6. In a process for effecting chemical reactions between at least two reactants, said process comprising the following steps:

(a) flowing an influent liquid including said reactants through a first pipe;

(b) heating said influent liquid and reactants under pressure to initiate said chemical reaction in a reaction zone;

(c) returning said liquid in a second pipe as an effluent liquid with said liquid in said second pipe in heat transfer relation with said influent liquid in said first pipe; and (d) controlling the temperature and pressure of said effluent liquid to initiate boiling of said effluent liquid in said second pipe spaced from said reaction zone, vaporizing at least a portion of said liquid in said second pipe, reducing the pressure in said second pipe and increasing the mass transfer rate through said pipes while preventing boiling of said fluid in said first pipe.

7. The process for effecting chemical reactions defined in claim 6, characterized in that said pipes have different diameters with the smaller pipe nested within the larger pipe and the larger pipe having a closed end, said method including establishing said reaction zone having an elevated temperature near said closed end and boiling said liquid in said second pipe adjacent the end of said pipe spaced from said reaction zone.

8. In a continuous process for effecting exothermic reactions between at least two reactants in a deep well reaction apparatus, comprising the following steps:

(a) flowing an influent liquid including at least one of said reactants downwardly through a downflowing passage extending below ground in a subterranean opening forming a hydrostatic column of liquid defining a predetermined pressure sufficient to prevent boiling of said liquid in said downcoming passage;

(b) flowing said liquid as an effluent liquid upwardly through an upflowing passage to ground level;

(c) heating said liquid and said reactants in a reaction zone located adjacent the lower portion of said passages, thereby initiating said exothermic reaction; and (d) controlling the temperature and pressure of said effluent liquid to initiate boiling of said effluent liquid in said upcoming passage, vaporizing at least a portion of said effluent liquid, generating vapor bubbles in said upcoming passage, thereby reducing the hydrostatic pressure in said upflowing passage and increasing the mass flow rate.

9. The process for effecting exothermic reactions defined in claim 8, wherein said method further includes maintaining a predetermined pressure in said upflowing passage sufficient to prevent boiling of said upwardly flowing liquid during initiation of said exothermic reaction, thereafter reducing said upflowing fluid passage pressure to cause boiling of said fluid in said upflowing passage.

10. The process for effecting exothermic reactions defined in claim 9, including sensing the temperature of said liquid in said upflowing passage at a predetermined depth, then reducing the pressure in said upflowing passage to the boiling pressure of said liquid at said predetermined depth temperature.

11. The process for effecting exothermic reactions defined in claim 9, comprising periodically adjusting said upflowing liquid passage pressure to periodically boil said fluid in said upcoming passage at predetermined timed intervals.

12. In a process for wet oxidation treatment of a waste material having a predetermined COD suspended in a liquid, said method comprising the following steps:

(a) flowing an influent liquid including said waste material downwardly through a downflowing passage extending below ground in a subterranean opening forming a hydrostatic column of liquid defining a predetermined pressure;

(b) heating said influent liquid and waste material in the presence of oxygen to initiate wet oxidation of said waste in the lower portion of said downflowing passage, establishing a reaction zone in said lower portion of said downflowing passage;

(c) flowing said liquid and treated waste material comprising an effluent upwardly through an upflowing passage to ground level; and (d) controlling the temperature and pressure of said effluent liquid to initiate boiling of said effluent liquid in said upcoming passage, vaporizing at least a portion of said effluent liquid, generating vapor bubbles in said upflowing passage, and thereby reducing the hydrostatic pressure in said upflowing passage and increasing the mass flow rate through said passages.

13. The process for wet oxidation treatment of a waste material defined in claim 12, including controlling said effluent liquid pressure and temperature by sensing the temperature of said effluent liquid in said upflowing passage at a predetermined depth, then reducing the pressure in said upflowing passage to the boiling pressure of said effluent liquid at said predetermined depth temperature.

14. The process for wet oxidation treatment of a waste material defined in claim 13, further including periodically adjusting said upflowing effluent liquid passage pressure to periodically boil said liquid in said upcoming passage at predetermined timed intervals.

15. In a method of effecting wet oxidation reactions of waste suspended in a liquid in a reaction apparatus, said apparatus including generally vertical upcomer and downcomer pipes extending below ground in a subterranean opening, said pipes having different diameters with the smaller pipe nested within the larger pipe providing crosscurrent flow, said process comprising the following steps:
 (a) flowing an influent liquid including said waste downwardly through said downcomer pipe forming a hydrostatic column of fluid defining a predetermined pressure sufficient to prevent boiling of said influent liquid;
 (b) flowing said liquid as an effluent upwardly through said upcomer pipe with said upwardly flowing effluent liquid in said upcomer pipe in heat transfer relation with said influent downflowing liquid in said downcomer pipe;
 (c) adding oxygen and heating said influent liquid in said downcomer pipe to initiate said wet oxidation reaction in a reaction zone located in the lower portion of said pipes; and
 (d) controlling the temperature and pressure of said effluent liquid initiating boiling in said upflowing effluent liquid in said upcomer pipe, vaporizing at least a portion of said effluent liquid, generating vapor bubbles in said upcomer pipe, and thereby reducing the hydrostatic pressure in said upflowing pipe and increasing the mass flow rate of said liquid through said pipes.

16. The method of effecting wet oxidation reactions defined in claim 15, wherein said method includes establishing a predetermined pressure on said effluent in said upcomer pipe during initiation of said wet oxidation reaction, then reducing said effluent pressure to initiate boiling of said upflowing effluent liquid in said upcomer pipe.

17. In a continuous method of effecting wet oxidation reactions of organic animal waste suspended in a liquid in a reaction apparatus, said apparatus including generally vertical pipes extending below ground in a subterranean hole including upcomer and downcomer pipes in fluid heat transfer relation, said method including the following steps:
 (a) flowing an influent liquid including said organic animal waste downwardly through said downcomer pipe forming a hydrostatic liquid column defining a predetermined pressure;
 (b) flowing said liquid upwardly as an effluent through said upcomer pipe in heat transfer relation with said liquid influent;
 (c) heating said downflowing influent liquid in the presence of oxygen to initiate said wet oxidation reaction in a reaction zone in the lower portion of said pipes;
 (d) maintaining a predetermined minimum pressure on said effluent liquid in said upcomer pipe during initiation of said wet oxidation reaction; and
 (e) periodically and intermittently initiating boiling of said effluent liquid in said upcomer pipe vaporizing at least a portion of said liquid, generating vapor bubbles in said upcomer pipe, thereby reducing the hydrostatic pressure in said upcomer pipe and increasing the flow rate through said pipes when said pressure exceeds a predetermined maximum.

18. The method of effecting wet oxidation reactions of organic animal waste defined in claim 17, including sensing the temperature of said effluent liquid in said upcomer pipe at a predetermined depth and periodically and intermittently reducing said pressure in said upcomer pipe to initiate boiling at the temperature sensed.

19. The method of effecting wet oxidation reactions of organic animal waste defined in claim 18, including increasing the mass flow rate through said pipes sufficiently to periodically quench said boiling in said upcomer pipe while maintaining said wet oxidation reaction.

20. The method of effecting wet oxidation reactions of organic animal waste defined in claim 17, including injecting oxygen in said influent fluid adjacent the upper extent of said reaction zone in said downcomer pipe.

21. In a process for effecting a chemical reaction between at least two reactants, said process comprising the following steps:
 (a) flowing an influent liquid including at least one of said reactants under pressure downwardly through a downflowing passage extending below ground in a subterranean opening forming a hydrostatic liquid column having a predetermined pressure;
 (b) heating said influent liquid in said downflowing passage in the presence of both of said reactants to initiate said chemical reaction in a reaction zone located in the lower portion of said downflowing passage;
 (c) flowing the effluent from said chemical reaction including said liquid upwardly through an upflowing passage to ground level while maintaining a predetermined minimum outlet pressure in said upcomer passage;
 (d) periodically reducing the pressure in said upcoming passage to initiate boiling of said liquid effluent, vaporizing at least a portion of said liquid and generating vapor bubbles to a predetermined depth in said upflowing passage; and
 (e) increasing the mass flow rate of said influent fluid to periodically quench said boiling.

22. In a process for effecting a chemical reaction between at least two reactants, said process comprising the following steps:
 (a) flowing an influent liquid including said reactants downwardly through a downflowing passage extending below ground in a subterranean opening forming a hydrostatic liquid column defining a predetermined pressure;
 (b) heating said influent liquid in said downflowing passage to initiate and maintain said chemical reaction in a reaction zone located in the bottom portion of said downflowing passage wherein said predetermined pressure is sufficient to prevent boiling of said influent liquid in said downflowing passage;
 (c) flowing said liquid and reaction products as an effluent liquid upwardly through an upflowing passage to ground level;
 (d) maintaining a predetermined pressure on said effluent liquid in said upcoming passage during initiation of said chemical reaction;
 (e) periodically reducing said pressure on said effluent liquid in said upflowing passage to initiate and maintain boiling of said effluent liquid in said upflowing passage vaporizing at least a portion of said effluent liquid and generating vapor bubbles in said upcoming passage when said pressure exceeds a predetermined maximum to reduce the hydrostatic pressure in said upflowing passage and increase the mass flow rate through said passages.

* * * * *

UNITED STATES PATENT AND TRADEMARK OFFICE
CERTIFICATE OF CORRECTION

PATENT NO. : 4,744,908

DATED : May 17, 1988

INVENTOR(S) : Hermann W. Peterscheck and Leonard A. Kaufmann

It is certified that error appears in the above-identified patent and that said Letters Patent is hereby corrected as shown below:

Column 11, line 19, change "4" to -- 2 --.

Column 12, line 22, change "fluid" to -- liquid --.

Signed and Sealed this

Fourth Day of October, 1988

Attest:

DONALD J. QUIGG

*Attesting Officer*   *Commissioner of Patents and Trademarks*